United States Patent Office 3,849,527
Patented Nov. 19, 1974

3,849,527
METHOD FOR MAKING REINFORCED OR
FILLED RESIN PRODUCTS
Frede Hilmar Drostholm, 2950 Vedbaek, Denmark
No Drawing. Continuation of abandoned application Ser.
No. 158,084, June 29, 1971. This application May 31,
1973, Ser. No. 365,698
Int. Cl. D04h 1/58
U.S. Cl. 264—35                                   16 Claims

ABSTRACT OF THE DISCLOSURE

A method for forming fiber reinforced and/or filled resin materials or articles, especially by the use of a polyester resin, a cross-linking compound, and a catalyst, in which the polyester resin separate from the cross-linking compound and catalyst is applied to the fiber reinforcement and/or filler, and the cross-linking compound and catalyst are preferably applied to the polyester-bearing reinforcement or filler after the reinforced and/or filled resin material is shaped to the contours desired for the materials or articles being made.

---

The present application is a continuation of my application 158,084, filed June 29, 1971, now abandoned.

The present invention deals with a procedure for the manufacture of materials and articles of reinforced and/or filled polyester resins by which method the polyester cures by means of an unsaturated monomer resulting in cross-linking, a catalyst and—if necessary—an accelerator.

By the established methods for the manufacture of such materials and articles, the solid polyester is dissolved in the monomer to form a highly viscous substance, and then the reinforcement material or filler is added. It is a disadvantage that the polyester may cross-link with the monomer prematurely, and the pot-life of the mixture becomes short. Furthermore, the addition of the reinforcement material and/or other fillers is difficult because the liquid mixture reaches a high degree of viscosity so that agitating is hardly possible. Therefore, only limited quantities of reinforcing and/or filler materials can be used. Furthermore, agitation of the highly viscous mixture has a deteriorating effect on the fillers and/or reinforcing materials, especially on fibrous reinforcement such as asbestos and glass fibers. Thus, it was found that the impact resistance of a conventional glass fiber-reinforced dough molding compound after a mixing period of 20 minutes was reduced to approximately ⅒ of the value obtained after a 5 minute mixing period, due to the fiber rupture caused by mechanical work.

Therefore, it is an object of this invention to provide a process by which the reinforcement and/or filler materials can be incorporated in the polyester resin without these processing drawbacks and without exposing the reinforcement or filler materials to destructive mechanical conditions.

A typical procedure according to the present invention is characterized as follows: Reinforcement and/or filler materials are dry-mixed with the polyester or coated with a melt or solution or dispersion of the polyester. Monomer and catalyst are added to the mixture of the polyester with the solid reinforcement and/or filler materials when the mixture is placed in the location where the curing is to take place.

In this way difficulties connected with the mixing of a viscous polyester resin that is in the process of curing are avoided, as the liquid monomer dissolves the polyester and penetrates into the mixture of polyester and reinforcement and/or filler materials; and by means of catalyst also added to the mixture, the composition cures immediately. A mechanically made mixture of dry powdered polyester and reinforcement or filler materials does not expose the latter to such destructive forces as when they are agitated in a viscous resin composition. In many cases the curing can take place without agitating the filler or reinforcement materials as the two components can be mixed just by powdering the filler and reinforcement materials with polyester powder. The same careful treatment of filler or reinforcement materials without agitation is possible by coating them with a melt or solution of the polyester. This method also offers considerable advantages as far as the work involved is concerned because it is not necessary to handle a highly viscous sticky substance, and this is of especial advantage where it is desired to portion cut and place into a mold or molds individual batches of the substance in order to provide for the shaping of articles being made. According to an alternative method of this invention, the dry mixing of filler or reinforcement materials with the polyester resin can even be done in a mold, after which the cross-linking agent and catalyst may be added.

The procedure according to this invention permits the use of all known unsaturated polyesters, such as those formed by condensing an ethylenically unsaturated dicarboxylic acid or anhydride thereof, such as for example, fumaric acid and maleic anhydride, with a polyalcohol such as, for example, ethylene glycol, propylene glycol and bisphenol-A. In preparing such unsaturated polyesters, it is common to substitute a portion of the ethylenically unsaturated dicarboxylic acid with a saturated dicarboxylic acid or anhydride thereof such as, for example, phthalic anhydride and chlorendic acid (HET acid) and diallyl phthalate. As the cross-linking monomer, there can be used, as is known, any ethylenically unsaturated monomeric compound such as, for example, styrene, methyl methacrylate, diallyl phthalate, vinyl acetate, acrylonitrile, vinyl toluene, and triallyl cyanurate. Styrene is a preferred cross-linking agent.

As catalyst can be used, both those acting by means of a free radical mechanism such as benzoylperoxide, methylethylketoneperoxide, cyclohexanonperoxide, tertiary butyldroperoxide and the UV-initiated catalysts such as benzoin. The catalyst may be added in solution in the monomer.

In case an accelerator is used, it can be added to the mixture of polyester and reinforcement or filler materials, and this mixture then only requires soaking with the solution of catalyst in the monomer. It is an advantage that in this way the procedure does not require the use of catalysts with a thermic high activating level thereby increasing the storage life of the dough molding compound. The curing can be done at room temperature if only the time for the solution of the catalyst in the monomer is adjusted to the pot-life required for the mixture.

Examples of reinforcement materials especially suitable for use in the practice of this invention are: glass fibers, asbestos fibers, metal fibers, synthetic fibers, carbon fibers and glass balls. The following are examples of filler materials: kaolin, talc powder, asbestos, quartz and aluminum oxide and pigments.

According to the invention, one specially advantageous technique for pressure molding or shaping of articles consists of placing a dry mixture of polyester, reinforcement or filler and, if needed, accelerator, in a closed shaping tool comprising a porous mold, and then adding a solution of catalyst in the monomer through the porous mold walls. In this way, adjusting of the added quantity of hardener can very simply be done by discontinuing the pressure on the hardener, and no portioning out of separate batches of material for the manufacture of each article is required.

By the already established procedure for casting of pressed substances in mold, precious press-tools are required as for the casting—due to the desire of getting a close structure in connection with the slow flowing of the substance—high pressure in the tool is required, whereas this is not a requirement in the procedure according to the invention.

Another advantageous technique according to this invention, by which a fibrous or reinforcement material is used, consists of leading the fibrous reinforcement such as glass rovings or mat through a bath of melted polyester and cooling to form a solid body. The quantity desired for use is then cut from the thus obtained mixture, and thereafter a solution of catalyst in monomer is added. This procedure is especially convenient where a fiber-formed reinforcement material is involved.

Mixture of fiber-formed reinforcement material and polyester in dry state can according to the invention also be made in an efficient and convenient way by making fibers of the melted polyester first and then making an endless length or a mat of a mixture of polyester fibers and reinforcement fibers.

Another possibility consists of powdering an already made mat of fiber-formed reinforcement material with polyester powder and then heat treat same by which treatment an agglutination or adhesion of the polyester powder to the mat takes place. Such mats or lengths consisting of a mixture of polyester and reinforcement material can either be cut in lengths or cured in molds by addition of catalyst, or they can be used for the production of reinforced plates, in which case the mat or length is led through a so-called carpet-coating machine where the solution of catalyst in monomer is dosed or applied in a constant flow over the width or length of the mat.

The procedure according to the invention can with particular advantage be used for the production of wearing layers for flooring, or other coating or wear layers, etc. that contain granulated reinforcement materials such as gravel aggregate. Previously the pouring of big areas was very difficult due to the short life of viscous substances such as previously proposed for use. By means of the procedure according to the invention the granulated filler material is coated with melted polyester whereupon the coated, granulated material is applied in dry condition and rolled. The surface is then sprinkled with a mixture of monomer and catalyst. In this way in the case of road construction, the usual road-building machines can be used.

For production where spraying is used, the procedure according to the invention offers considerable advantages, the more so as the established procedure demands utilization of a complicated 2-component spray-gun due to the short pot-life of approximately one hour of the ready mixture of polyester, monomer and catalyst, whereas the procedure according to the invention only calls for a one-component spray-gun for the mixture of monomer and catalyst having a pot-life of from several days to several weeks.

The procedure according to the invention can also successfully be used for the production of great or large area workpieces of small thickness by means of wet-pressing in a tool or die. According to prior practice ready-made mats of reinforcement material are first placed on the patrix of the tool and the mixture of polyester, monomer and catalyst is poured over the reinforcement. The tool is then closed and the cure takes place under pressure. According to the procedure of the invention, the patrix may first be coated with reinforcement fibers covered with polyester, for instance electrostatically, and then the patrix is led through a chamber containing fog of monomer and catalyst that will be absorbed by the polyester-covered fibers. The forming tool is then closed and the cure occurs under a relatively low pressure. By this method a more even dispersion of the reinforcement fibers and a stronger product are obtained.

The procedure of the invention can also be used in the production of profiles or tubes of predetermined cross section, for instance by extrusion or pultrusion types of techniques in which a dry mix of polyester and reinforcement or filler material is fed to and through a nozzle. In this case the liquid cross-linking agent and catalyst can be added to the flow of dry ingredients in the nozzle or forming device of the equipment. Moreover, according to the invention, in the production of workpieces in a previously closed tool both polyester, reinforcement or filler material and catalyst and cross-linking agent may be injected.

A further clarification of the invention is given in the following examples.

EXAMPLE 1

A mixture of 50 parts by weight of gravel of the grain size 3–5 mm. and 20 parts by weight of the grain size ½–1 mm. are heated to approximately 200° C. and powdered, while in motion with a mixture of 15 parts by weight of powdered polyester and 0.2 parts by weight of 10% powdered cobaltnaphthenate. Thereby, a coating of the gravel takes place due to the melting of the polyester. After cooling the gravel has a dry surface. The coated gravel is spread on a concrete surface and rolled; and then 13 parts by weight of styrene in which 1.8 parts by weight of methylethylketoneperoxide has been dissolved is sprayed on the surface. The surface is finally rolled lightly by a porous roller. In this way a non-slip finish and hard-wearing surface appropriate for top or wear layers or flooring in factory halls is obtained.

EXAMPLE 2

30 parts by weight of glass fiber in form of a mat is powdered with 40 parts by weight of polyester powder and 0.2 parts by weight of cobaltnaphthenate powder and then heated until the polyester is dissolved and absorbed in the mat. The dry impregnated glass fiber mat is then placed in a form and 28 parts by weight of styrene in which 1.8 parts by weight of methylethylketoneperoxide has been dissolved is applied manually by roller or swabbed over the mat, and after the curing a reinforcement sheet has been obtained.

The impregnated mat can also be pressed or cast in closed molds in which case the mixture of styrene may be injected after the closing of the mold.

EXAMPLE 3

60 parts by weight of glass fibers cut in 30 mm. lengths, 25 parts by weight of polyester powder and 0.1 part by weight of 10% cobaltnaphthenate powder are dry-mixed, and the mixture is placed in a mold that is then closed, whereupon a mixture of 14 parts by weight of styrene and 0.9 parts by weight of cyclohexanolperoxide is injected by pressure. In this way a pressure die cast body is obtained that due to the greater content of glass fiber and the better dispersion of same than in the established dough molding compound has a considerably greater strength than attained hitherto. The tensile strength is approximately 2500 kg./cm.$^2$, whereas the tensile strength of a traditional polyester dough molding compound does not exceed 700 kg./cm.$^2$.

I claim:

1. A method for manufacturing products or articles or reinforced or filled polyesters, hardenable by means of a liquid ethylenically unsaturated monomeric cross-linking compound which is a solvent for said polyester, in the presence of a catalyst, which method comprises dry mixing the polyester with the reinforcing or filling material in the absence of the crosslinking compound and the catalyst, imparting the desired shape to the mixture of polyester and reinforcing or filling material, thereafter adding the liquid crosslinking compound and catalyst in the absence of the polyester to the shaped mixture of polyester and reinforcing or filling material, and thereafter curing the resin materials to form the product.

2. A method as defined in Claim 1 in which the polyester mixed with the reinforcing or filling material, is a polyester in powder form.

3. A method as defined in Claim 2 in which the mixture is heated to melt the polyester and thereby coat the reinforcing or filling material before the addition of the crosslinking compound and catalyst.

4. A method as defined in Claim 2 in which the polyester powder is dry mixed with preheated particulate filler particles to effect coating of the filler particles with the polyester resin.

5. A method as defined in Claim 4 in which the mixture of the polyester and particulate filling material is spread in a layer upon a supporting surface and in which the addition of the crosslinking compound and catalyst is effected by spraying.

6. A method as defined in Claim 2 in which the polyester powder is dry mixed with preheated reinforcing fibers to effect coating of the fibers with the polyester.

7. A method as defined in Claim 6 in which the reinforcing fibers are glass fibers.

8. A method as defined in Claim 1 in which the polyester mixed with the reinforcing or filling material is in the form of preformed polyester fibers.

9. A method as defined in Claim 8 in which the polyester fibers are mixed with reinforcing fibers.

10. A method as defined in Claim 9 in which the mixing of the polyester fibers with the reinforcing fibers is effected in mat form.

11. A method as defined in Claim 1 in which an accelerator is dispersed in the polyester resin to be mixed with the reinforcing or filling material.

12. A method as defined in Claim 1 in which the mixture of polyester and reinforcing or filling material is placed in a mold having a porous wall and in which a solution of the catalyst in the liquid crosslinking agent is added by delivering said solution through the porous mold wall.

13. A method for manufacturing products or articles of reinforced or filled polyesters, hardenable by means of a liquid ethylenically unsaturated monomeric crosslinking compound which is a solvent for said polyester, in the presence of a catalyst, which method comprises heating particulate polyester to effect melting thereof in the absence of the crosslinking compound and the catalyst, mixing the heated molten polyester with the reinforcing or filling material in the absence of the crosslinking compound and the catalyst, imparting the desired shape to the mixture of polyester and reinforcing or filling material, thereafter adding the liquid crosslinking compound and catalyst in the absence of the polyester to the shaped mixture of polyester and reinforcing or filling material, and thereafter curing the resin materials to form the product.

14. A method as defined in Claim 13 in which the molten polyester is mixed with particulate filling material by coating the filler particles with the molten polyester.

15. A method as defined in Claim 13 in which the molten polyester is mixed with fibrous reinforcing fibers by passing the fibers through an impregnating bath of the molten polyester.

16. A method as defined in Claim 13 in which granulated filler particles are coated with molten polyester, in which the polyester coating is solidified, in which the coated filler is spread in a layer on a flooring or roadway surface, and in which a solution of the catalyst in the liquid crosslinking compound is sprayed upon the layer of the coated filler.

References Cited
UNITED STATES PATENTS

| | | | |
|---|---|---|---|
| 3,547,728 | 12/1970 | Wittenwyler | 264—128 |
| 3,608,010 | 9/1971 | Stayner | 264—122 |

FOREIGN PATENTS

| | | | |
|---|---|---|---|
| 1,143,859 | 1969 | Great Britain | 264—331 |
| 1,106,837 | 1955 | France | 264—331 |

ROBERT F. WHITE, Primary Examiner

G. AUVILLE, Assistant Examiner

U.S. Cl. X.R.

264—122, 128, 240, 261, 347